(12) United States Patent
De Man et al.

(10) Patent No.: US 7,227,982 B2
(45) Date of Patent: Jun. 5, 2007

(54) THREE-DIMENSIONAL REPROJECTION AND BACKPROJECTION METHODS AND ALGORITHMS FOR IMPLEMENTATION THEREOF

(75) Inventors: Bruno Kristiaan Bernard De Man, Clifton Park, NY (US); Samit Kumar Basu, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 856 days.

(21) Appl. No.: 10/356,161

(22) Filed: Jan. 31, 2003

(65) Prior Publication Data
US 2004/0013294 A1    Jan. 22, 2004

Related U.S. Application Data

(63) Continuation-in-part of application No. 10/121,867, filed on Apr. 15, 2002, now Pat. No. 6,724,856.

(51) Int. Cl.
*G06K 9/00* (2006.01)
(52) U.S. Cl. ............... 382/132; 382/131; 378/62; 378/98
(58) Field of Classification Search ............... 382/131, 382/132; 378/4, 19, 62, 98, 901
See application file for complete search history.

(56) References Cited

U.S. PATENT DOCUMENTS

| 5,414,622 | A | 5/1995 | Walters |
| 5,416,815 | A | 5/1995 | Hsieh |
| 6,137,856 | A | 10/2000 | Lin |
| 6,339,632 | B1 * | 1/2002 | Besson .................. 378/15 |
| 6,438,195 | B1 | 8/2002 | Hsieh |
| 2003/0208117 | A1 * | 11/2003 | Shwartz et al. ............. 600/407 |

OTHER PUBLICATIONS

Schwinger, R.B. et al., "Area Weighted Convolutional Interpolation For Data Reprojection In Single Photon Emission Computed Tomography", *Journal of Numerical Control*, Concord, NH, US, vol. 13, No. 3, May 1, 1986, pp. 350-353.
International Search Report for RD-123956.

* cited by examiner

*Primary Examiner*—Samir Ahmed
*Assistant Examiner*—Craig W. Kronenthal
(74) *Attorney, Agent, or Firm*—Jean K. Testa; Curtis B. Brueske

(57) ABSTRACT

Methods for three-dimensional projecting and backprojecting rays with respect to voxels/detector bins to attenuate/eliminate high-frequency artifacts, are disclosed. A distance-driven technique wherein the transitions of the voxels and the detector bins are respectively projected onto a predetermined plane. This projection allows a determination of the contribution of each of the voxels/bins for each of the bins/voxels with lower computation time and improved artifact free images.

10 Claims, 14 Drawing Sheets

(RAY DRIVEN TECHNIQUE)

THREE-DIMENSIONAL REPROJECTION AND BACKPROJECTION METHODS AND ALGORITHMS FOR IMPLEMENTATION THEREOF

CROSS REFERENCE TO RELATED APPLICATIONS

This patent application is a continuation-in-part of U.S. patent application Ser. No. 10/121,867 having a filing date of Apr. 15, 2002 now U.S. Pat. No.6,724,856.

BACKGROUND OF THE INVENTION

The present invention relates generally to the processes of reprojection-backprojection, and more specifically, to reprojection-backprojection techniques/algorithms that includes new interpolation and data access schemes that result in better speed, lower artifacts. lower noise and higher spatial resolution than existing techniques.

In computed tomography, the operation that transforms an N-Dimension image into an N-Dimension set of line integrals is called the forward projection or reprojection. The most evident example of this operation is the physical process that generates an X-ray image of an object. After logarithmic conversion, an X-ray image is well approximated as the line integral projection of the distribution of the object's linear attenuation coefficient. In practice, a forward projector is required for tomographic simulations or when performing iterative reconstruction.

The transpose operation is called backprojection. This is used in filtered backprojection and in iterative reconstruction, which form the bulk of today's reconstruction algorithms.

Many methods for reprojection and backprojection exist. In one method each X-ray beam is represented by a line and the intersection length of each line with each pixel is used as weight factor. Another technique performs linear interpolation between two pixels for each row or column that the X-ray beam intersects (see FIG. 1). The latter two methods are ray-driven methods.

In the projection case, all projection lines are looped over, and for each projection line the image weighting and summing image pixel values are run through in order to approximate a ray-integral. The backprojection is defined as the transpose operation: the weight factors remain the same, but the detector values are weighted and assigned to the image pixels.

Another technique is the pixel-driven approach, which is typically used in filtered backprojection (see FIG. 2). All image pixels are looped over, and for each image pixel a line is drawn connecting the source and the image pixel. The intersection of that line with the detector array is then determined. Linear interpolation is performed between the two detector values nearest to the intersection point and the result is assigned to the image pixel. The reprojection operation is defined as the transpose operation. The weights for the left and right detector bin are given by $$\omega_l = \frac{d_r - d}{d_r - d_l} \quad \text{Eqn (1)}$$

$$\omega_r = \frac{d - d_l}{d_r - d_l}$$

where d is the location of the intersection, $d_r$ and $d_l$ are the first detector bin centers to the right and to the left of the intersection.

Other approaches exist, such as methods based on spherical basic functions and methods using nearest-neighbor or no interpolation.

The reprojection and backprojection operations are a computationally intensive but essential part of simulation and reconstruction techniques such as those used in CT or the like. Most existing approaches can be subdivided into ray-driven and pixel driven methods. One drawback to both the ray-driven and pixel driven methods resides in the fact that they introduce artifacts, the first one (viz., the ray driven method) in the backprojection and the latter (viz., the pixel driven method) in the reprojection. Another drawback to both methods resides in the percentage of the data used in each view reprojection/backprojection.

For example, in the case of a ray-driven projection of an image with pixels that are much smaller than the detector bin size, only a fraction of the pixels contributes to the projection at that angle. The same is true for the opposite case of the pixel driven backprojection. In iterative reconstruction, where both a reprojection and backprojection method are required, a combination of a ray-driven reprojection and pixel-driven backprojection could be considered to circumvent previous problems. However, even while this is possible, it is often preferred to use a matched reprojector-backprojector pair. In fact, an important criterion in choosing a reprojector-backprojector approach is speed.

The two main limiting factors on speed are arithmetic complexity and data access time. For the ray-driven approach, the arithmetic is relatively simple. It is therefore much faster than the pixel driven approach for small data sizes. At larger data sizes however, the data access time becomes more important and at this stage the pixel-driven approach starts to benefit from its sequential image access time while the ray-driven approach more or less accesses the data randomly. For the 3D cone-beam case, data sets become even larger and therefore data access time gains importance.

For further disclosure pertaining to these techniques and the types of apparatus which are used in connection therewith, reference may be had to U.S. Pat. No. 5,848, 114 issued on Dec. 8, 1998 in the name of Kawai et al.; U.S. Pat. No. 6,351,514 issued in the name of Besson on Feb. 26, 2002; U.S. Pat. No. 6,339,632 issued in the name of Besson on Jan. 15, 2002. The contents of these patents are hereby incorporated by reference thereto.

SUMMARY OF THE INVENTION

More specifically, a first aspect of the present invention resides in a method of image processing that includes projecting edges of each voxel of a voxel grid, which are intersected by a plurality of rays projected from a source to a detector, in a predetermined sequence of voxels in the voxel grid, onto a predetermined plane. The edges of each bin of a detector are projected onto the predetermined plane. The contribution of each voxel to a bin of the detector array or vice versa is determined in accordance with the projections of the voxel edges and the detector bin edges on the predetermined plane.

A second aspect of the invention resides in a method of image processing that includes establishing a voxel grid containing image voxels, which are arranged in image rows, columns and planes. Transitions between image voxels and transitions between detector-bins of a detector are continuously mapped. The detector detects radiation from a source, and detector bin transitions are projected onto a predetermined plane. The voxel transitions are projected onto the predetermined plane. At least one of the detector bins and voxels are weighted with an area on the predetermined plane, based on an area limited by adjacent projections.

A third aspect of the present invention resides in a computer readable medium encoded with a program executable by a computer for processing an image. The program is configured to instruct the computer to project edges of each voxel of a voxel grid, which is intersected by a plurality of rays projected from a source to a detector, in a predetermined sequence of voxels in the voxel grid, onto a predetermined plane. The edges of each bin of a detector are projected onto the predetermined plane. The contribution of each voxel to a bin of the detector array or vice versa is determined in accordance with the projections of the voxel edges and the detector bin edges on the predetermined plane.

A fourth aspect of the present invention resides in a computer readable medium encoded with a program executable by a computer for processing an image. The program is configured to instruct the computer to establish a voxel grid containing image voxels, which are arranged in image rows, columns and planes. Transitions between image voxels and transitions between detector-bins of a detector are continuously mapped. The detector detects radiation from a source, and detector bin transitions are projected onto a predetermined plane. The voxel transitions are projected onto the predetermined plane. At least one of the detector bins and voxels are weighted with an area on the predetermined plane, based on an area limited by adjacent projections.

DETAILED DESCRIPTION OF THE PREFERRED EMBODIMENTS

In order to better understand the embodiments of the present invention a more detailed explanation of the above prior art techniques is deemed appropriate. In FIGS. 1, 2, 6 and 7 the grid depicts a pixel image reconstruction grid which is fixed in a three dimensional coordinate system, onto which pixels are mapped in accordance with data acquired in response to a ray being projected from the source to the detector both (schematically shown). Each of the squares in these grids depicts a pixel.

Figure 1:
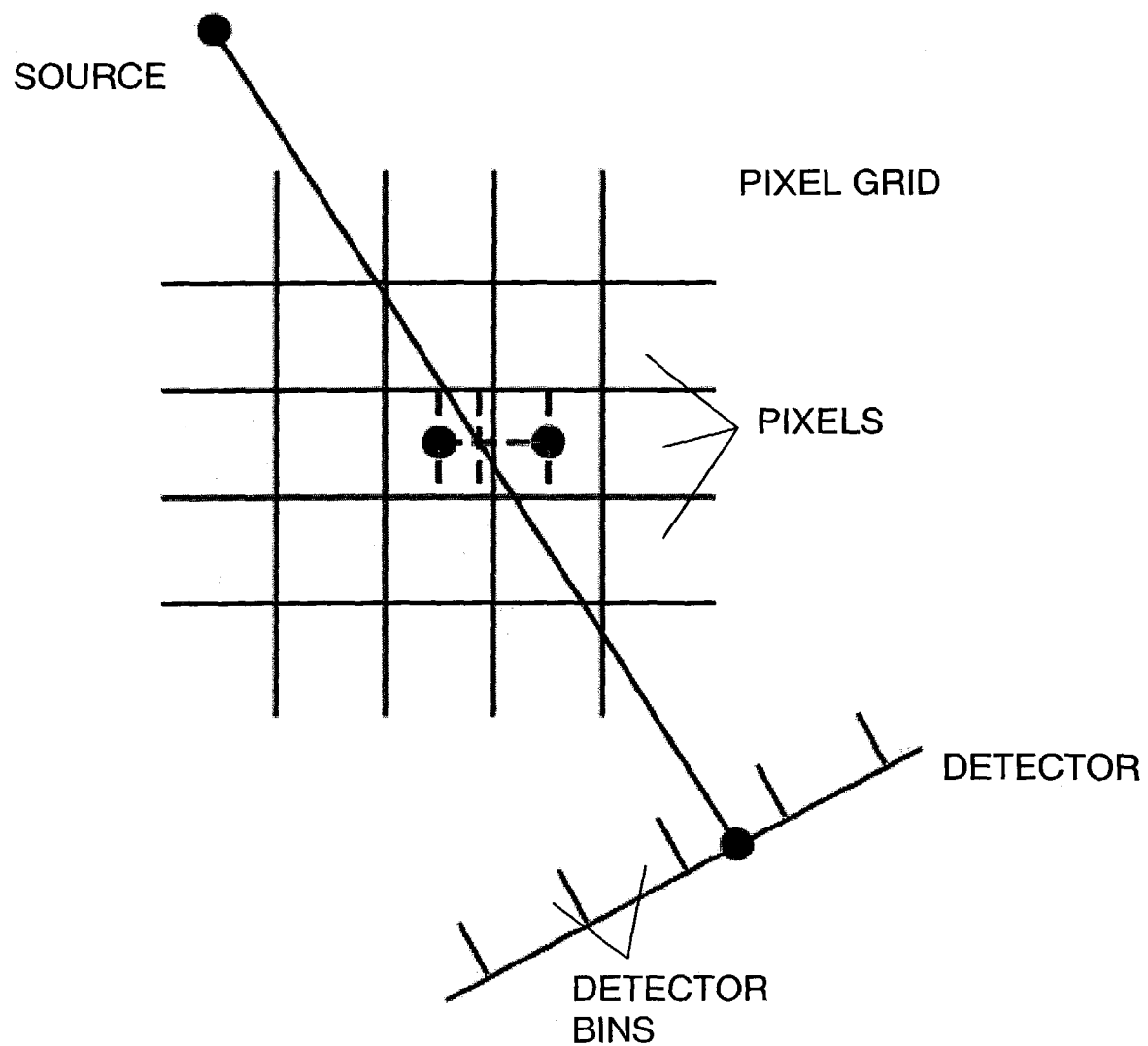
FIG. 1 is a schematic representation of a ray-driven reprojection-backprojection with linear interpolation wherein, for every row or column intersected by the projection line, linear interpolation is performed between the two adjacent pixels.
Figure 2:
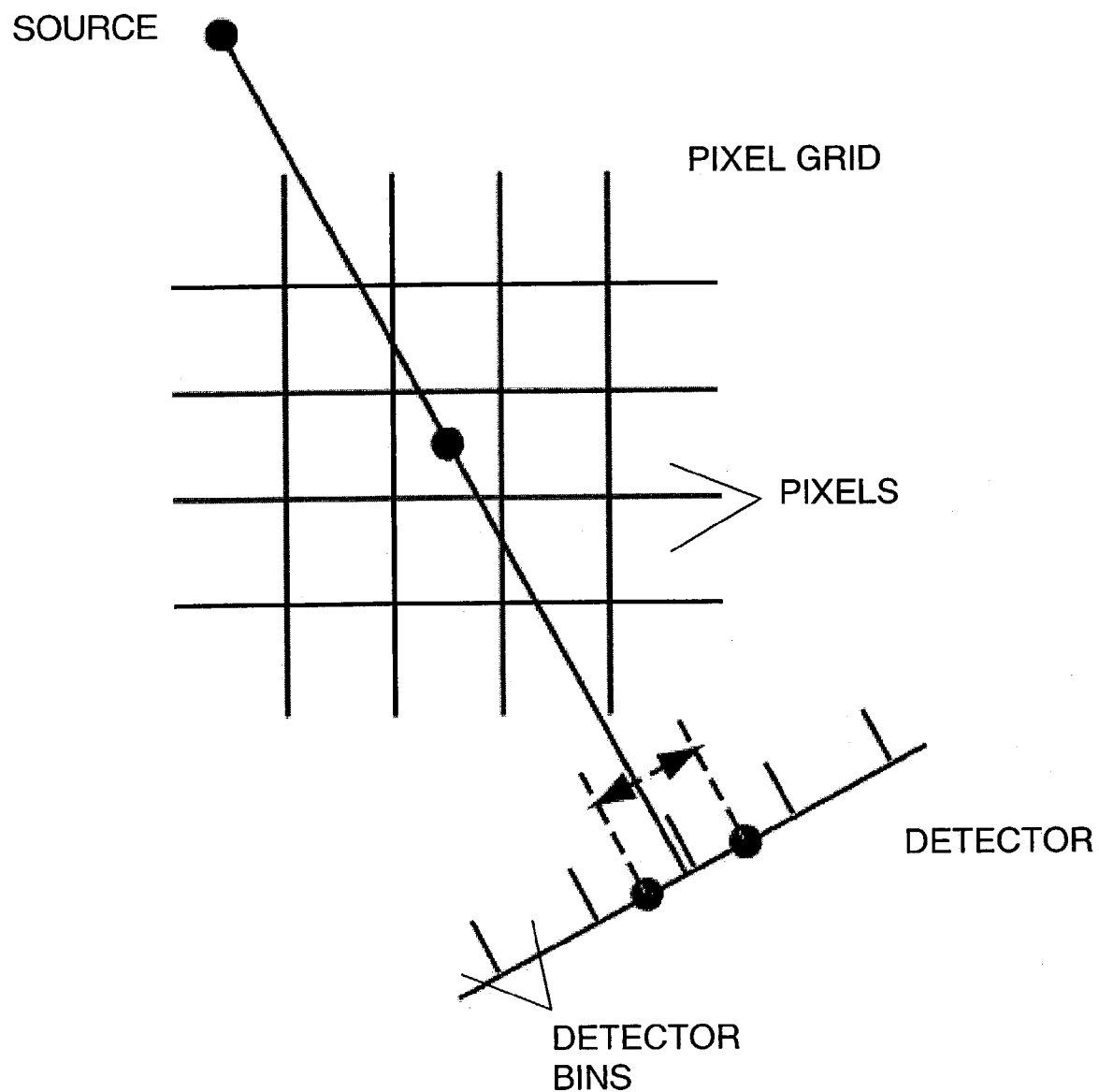
FIG. 2 is a schematic representation of a pixel-driven reprojection-backprojection with linear interpolation wherein a line connecting source and image pixel determines an intersection with the detector array and wherein linear interpolation is performed between the two adjacent detector bins.
Figure 3:
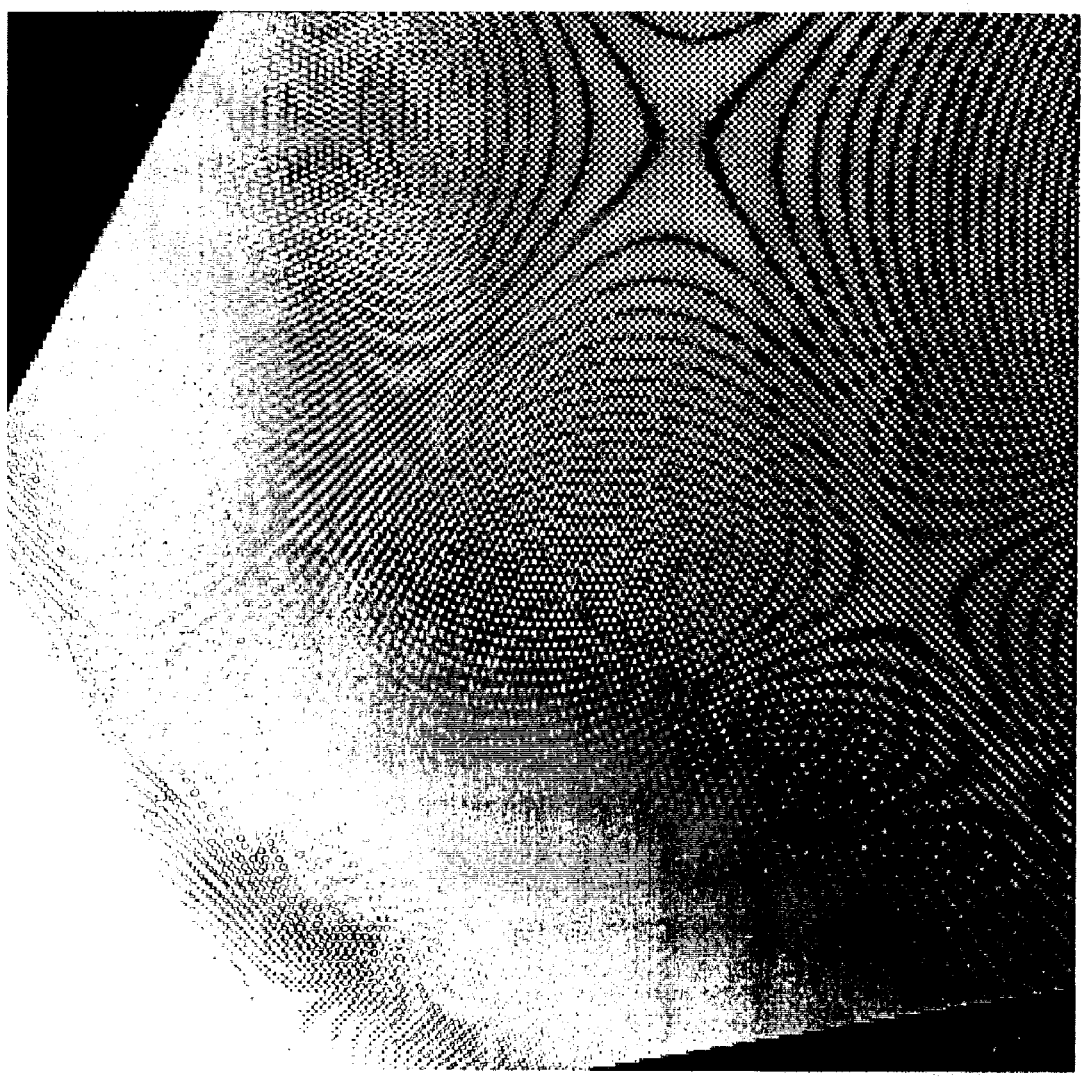
FIG. 3 is a depiction of a ray-driven backprojection of a uniform view showing the result wherein high-frequency artifacts are introduced because some pixels are updated more frequently than their neighbors.

As noted above, a drawback encountered with both the ray-driven and the pixel-driven method is that they introduce high-frequency artifacts, one in the backprojection and another in the reprojection. FIG. 3 shows an example of a ray-driven backprojection of one uniform view. The interference pattern is due to the fact that some pixels are updated more frequently than other pixels. The artifact problem is worse when the pixel size is small compared to the detector bin size, and vanishes when the pixel size is large compared to the detector bin size.

Figure 4:
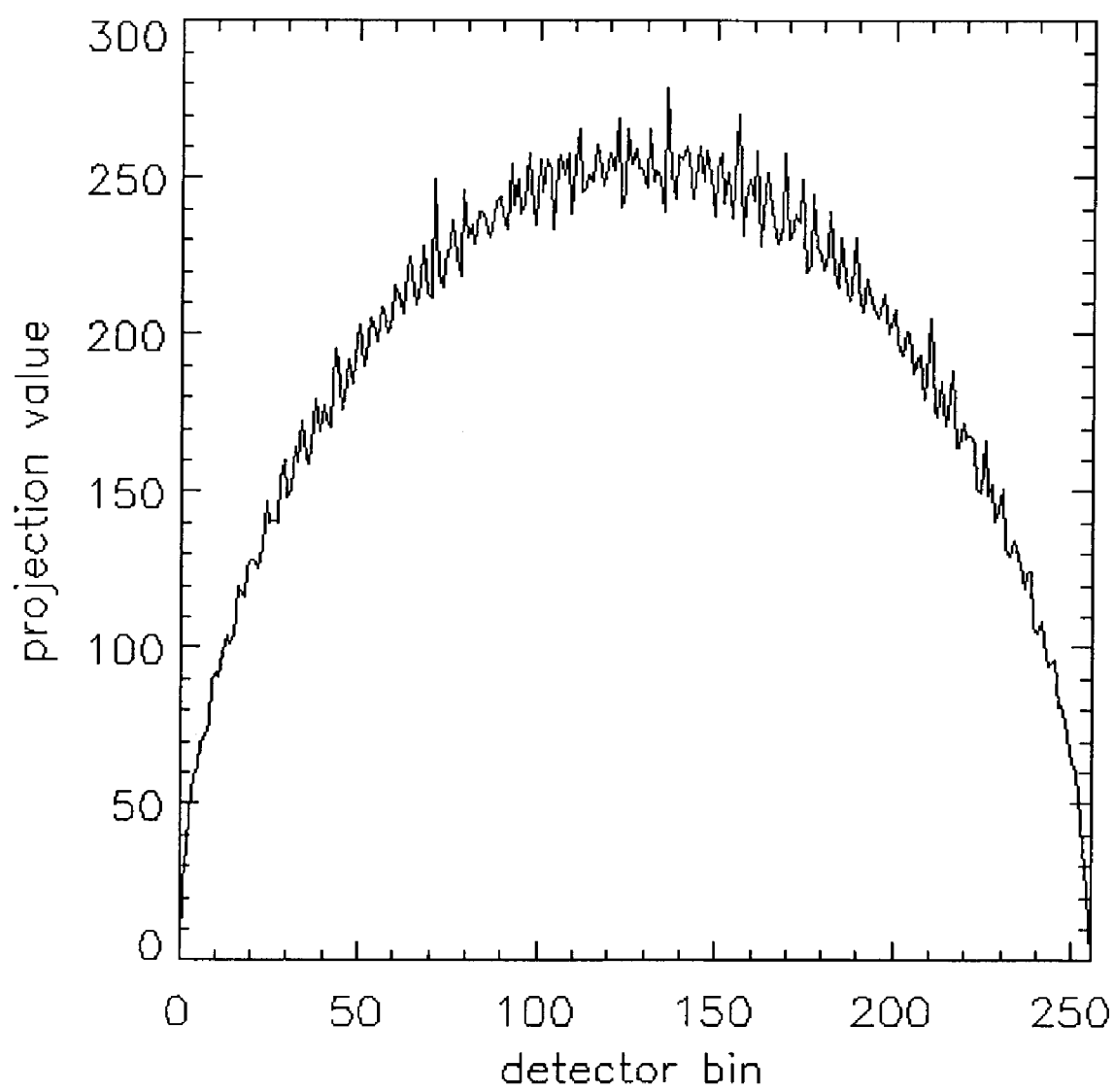
FIG. 4 is a graphical representation of a pixel-driven projection of a uniform disk wherein high-frequency artifacts are introduced because some detector bins are updated more frequently than their neighbors.

FIG. 4 graphically shows one sinogram line of a pixel-driven projection of a uniform disk. By way of example, in Computed Tomography, a measured data set (sinogram) is made up of a large number of views (projections). Each view corresponds to a measurement with the entire detector array, so each view in turn consists of a large number of detector bins (projection lines). A typical sinogram consists of 1500 views/projections of 1000 detector bins/projection lines.

As mentioned above, the interference pattern is due to the fact that some detector bins are updated more frequently than their neighbors. Further, the artifact problem is more pronounced when the detector bin size is small compared to the pixel size, and it vanishes when the detector bin size is large compared to the pixel size. In this instance the reprojections and backprojections were performed, simply by way of example, with a flat 2D fan-beam geometry, a magnification of 1.76, 256×256 pixels, 256 detector bins, 256 views over 360°, and an arbitrary start angle of 126°.

Another drawback of both methods resides in the data usage in each view projection/backprojection. Assume, for the sake of explanation, a ray-driven projection of an image with pixels that are much larger than the detector bin size (see FIG. 5). Only a fraction of the pixels contributes to the projection at that angle. Similarly, in a pixel-driven backprojection with pixels that are much smaller than the detector bin size, only a fraction of the detector values are used in each view. This results in poor noise performance. In iterative reconstruction this may also lead to poor convergence properties.

A very important criterion in choosing a projector-backprojector approach is computation speed. The two main limiting factors on computation speed are arithmetic complexity and data access time. With the ray-driven approach, the arithmetic is relatively simple. It is therefore faster than the pixel-driven approach for small data sizes. At larger data sizes however, the data access time becomes more critical. Under these conditions the pixel-driven approach begins to exhibit desirable processing speed characteristics due to its inherent sequential image data accessing which reduces access time while the ray-driven approach requires a much higher degree of random accesses because it jumps over large blocks of data and thus departs from the sequential manner in which the data is stored. This results in processing delays.

For the 3D cone-beam case, however, data sets become even larger and these effects become even more important.

a) Adaptation of the Pixel-driven and Ray-driven Projector-Backprojector

Figure 5:
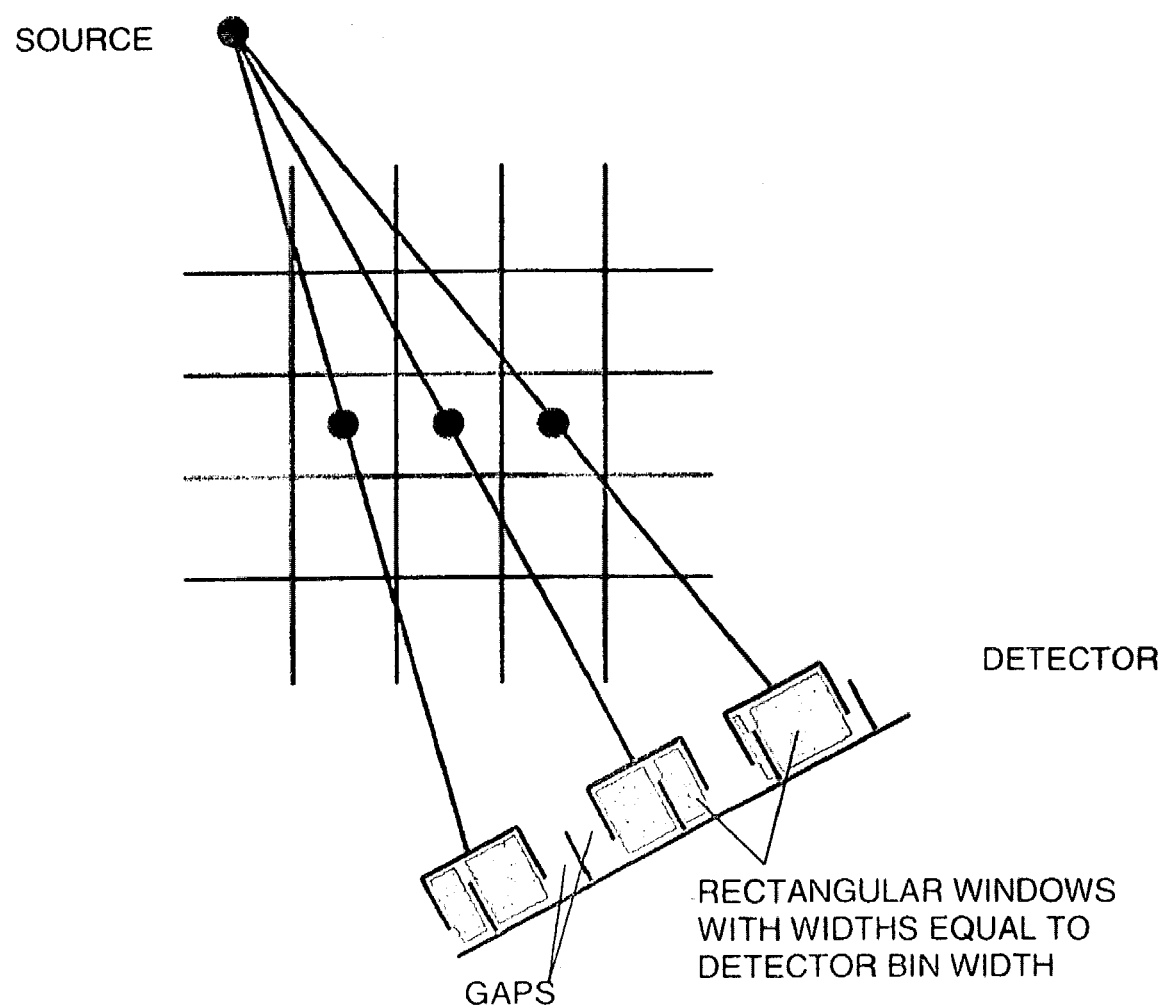
FIG. 5 is a schematic depiction of a representation of the pixel-driven linear inter-polation method wherein, due to the irregular overlap of the projected square windows, some detector bins will see more contributions than other, resulting in high-frequency oscillations.
Figure 6:
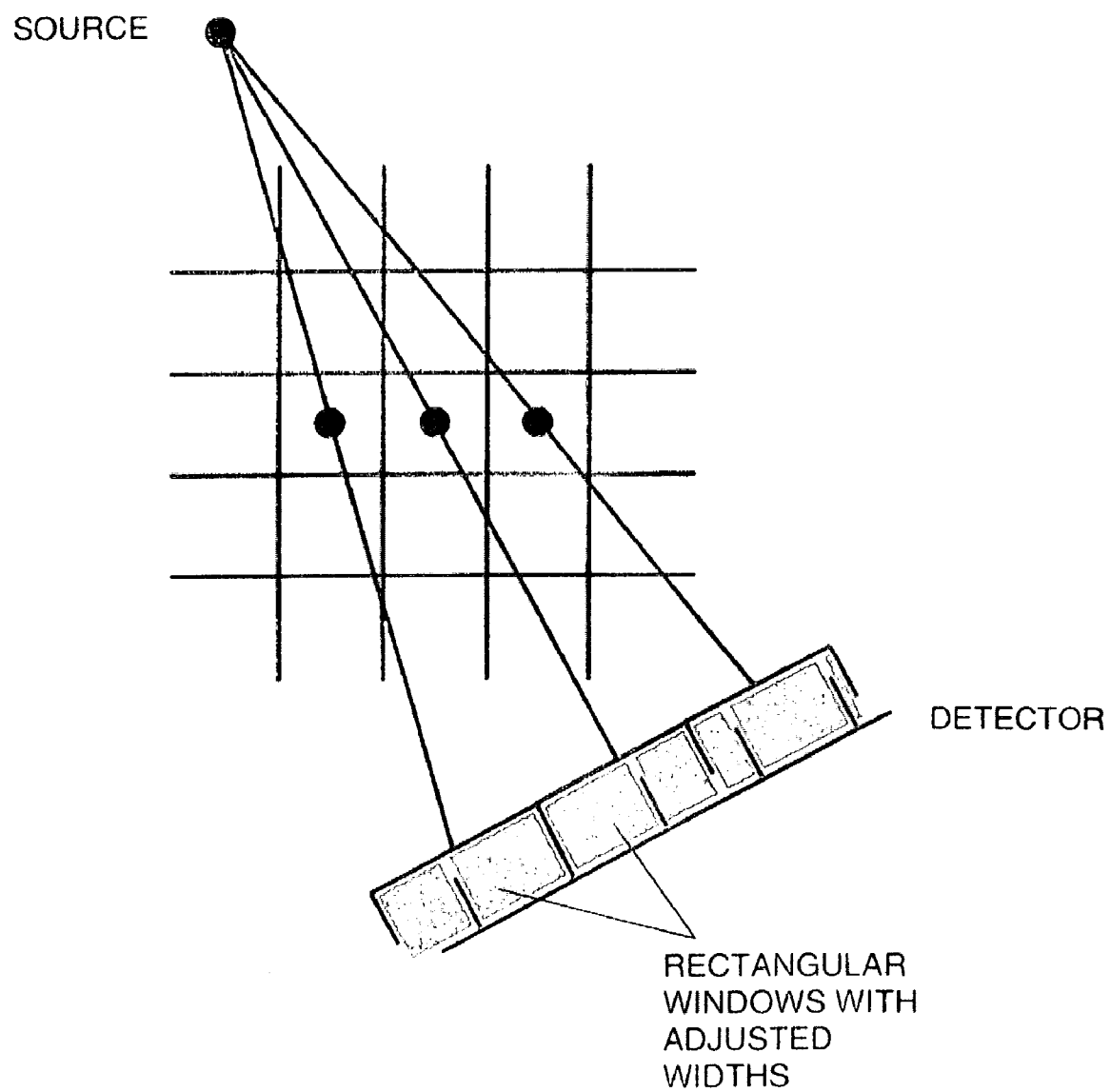
FIG. 6 depicts a pixel-driven linear interpolation method wherein the width of the square windows is adjusted so that they are always adjacent.

FIGS. 5 and 6 respectively demonstrate the features that show the shortcoming encountered with the prior art pixel driven technique and an embodiment of the invention wherein the pixel-driven technique is modified or adapted to prevent the high-frequency artifacts.

More specifically, an intersection with the detector array is located. At the intersection, a Dirac impulse with area equal to the pixel value is assumed. This is convolved with a rectangular window with a width equal to the detector bin size. The weights are obtained by integrating the result over both adjacent detector bins. This results in the following formula for the weights:

$$\omega_l = \frac{d_m - (d - (d_r - d_l)/2)}{d_r - d_l}$$  Eqn (2)

$$\omega_r = \frac{(d + (d_r - d_l)/2) - d_m}{d_r - d_l}$$

$$d_m = \frac{d_l + d_r}{2},$$

where $d_m$ is the position of the interface centered between $d_l$ and $d_r$. This is identical to equation 1, which shows the equivalence of this representation. It is desired, by projecting one uniform row of pixels, to achieve an essentially uniform projection over the projected range corresponding to this row (except for the slightly varying path length due to the varying location of intersection). However, due to the irregular overlap of the projected square windows, some detector bins will see more contributions than other, resulting in high-frequency oscillations.

This is solved, in accordance with this adapted ray driven embodiment of the invention, by adjusting the width of the square windows or shadows of the pixels so that they are always adjacent and so that gaps are eliminated and they effectively become continuous. This is illustrated by the gray shadowed areas in FIG. 6 and can be expressed as:

$$\omega_l = \max\left(\frac{\min(d_m, d + W/2) - (d - W/2)}{W}, 0\right)$$  Eqn (3)

$$\omega_r = 1 - \omega_l$$

$$W = \Delta p \cdot M \cdot \cos\alpha_d / \Delta d,$$

where W is the new width of the square window, $\Delta p$ is the pixel size, $\Delta d$ is the detector bin size, M is the magnification, and $\alpha_d$ is the angle of the projection line. Cos $\alpha_d$ can be pre-calculated if it is approximated by cos $\alpha_{dm}$. However, the window width W cannot be larger than the detector bin sized, $d_r$–$d_l$, because then it may overlap more than 2 detector bins.

The algorithm could, of course, be generalized to allow overlapping multiple detector bins using a while-loop for instance. However, this brings about the situation wherein the artifact reduction advantage does not balance the increase in algorithmic complexity.

In the adaptation of the pixel driven technique, the dynamic adjustment is applied to the pixels rather than the bins.

More specifically, a similar argument is made for the artifacts introduced in the ray-driven backprojection. This results in the following weights for the corrected algorithm:

$$\omega_l = \max\left(\frac{\min(p_m, p + W/2) - (p - W/2)}{W}, 0\right)$$  Eqn (4)

$$\omega_r = 1 - \omega_l$$

$$W = \Delta d / M / \cos\alpha_p / \Delta p,$$

where p is the location of the intersection, and $p_r$ and $p_l$ are the first pixel centers to the right and to the left of the intersection. However, in this instance, the window width W cannot be larger than the image pixel size, $p_r$–$p_l$, because then it may overlap more than 2 image pixels.

The speed of these adapted methods is assumed comparable to the original algorithms. Both adapted methods completely eliminate the artifacts shown in FIGS. 3 and 4, which result with the original methods . . .

b) Distance-driven Projection-Backprojection

The present invention is, in this embodiment, based on a continuous mapping of the detector array on an image row or column or vice versa and more particularly is based on mapping along the direction of the projection lines. For fast computation, all detector locations and image locations are projected onto an arbitrarily selected line, which can be, for example, the x- or y-axis of the image.

With this, the image data are accessed sequentially, similar to the pixel driven approach, the arithmetic is simple and similar to the ray-driven approach, no artifacts are introduced and all data is used uniformly in each view. The new algorithm is amendable for implementation in both hardware and software, is simple and provides speed, full data usage which reduces noise, and does not introduce artifacts.

Figure 7:
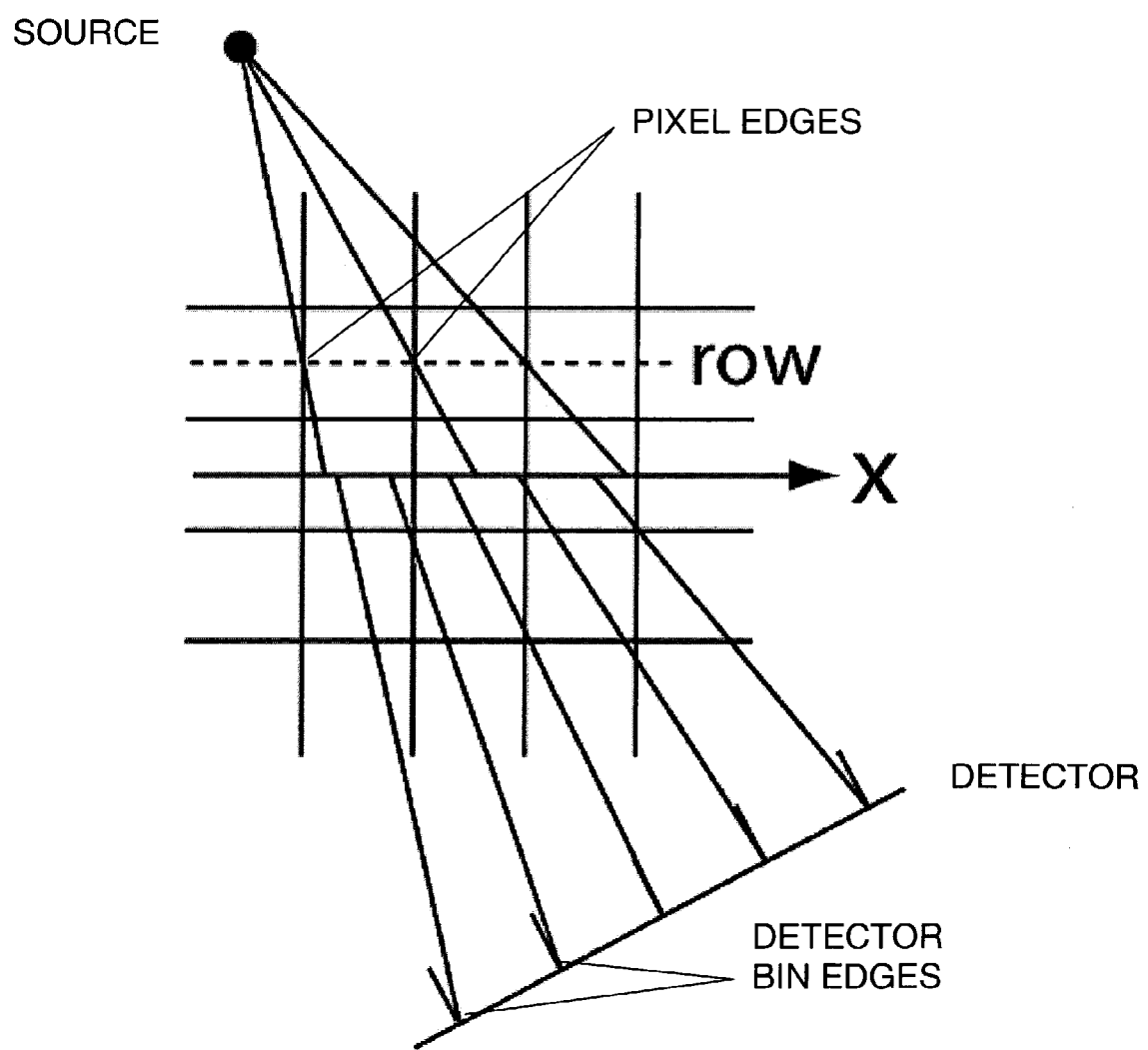
FIG. 7 depicts a distance-driven reprojector-backprojector wherein both the detector bin interfaces and the pixel interfaces are mapped onto the x-axis, and wherein the resulting segment lengths are used as weight factors in the projection and backprojection.

More specifically, the embodiment of this technique is illustrated in FIG. 7 and is based on a continuous mapping of the detector array onto an image row (or column) or vice versa, and more particularly on mapping along the direction of the projection lines. For fast computation, the x-axis (or y-axis) is, as mentioned above, used as reference for the relative location of pixels and detector bins. In order to define a continuous mapping of image pixels and detector-bins, rather than working with the centers, it is the transitions between pixels and between detector bins which are used. First, all detector bin transitions are projected onto the x-axis (or y-axis or an arbitrarily determined axis). Next all image rows (or columns) are looped over and the pixel transitions are projected onto the axis. A value is read from the image, weighted with the appropriate segment length defined between projections, and assigned to the detector bin or pixel as the case demands.

Figure 8:
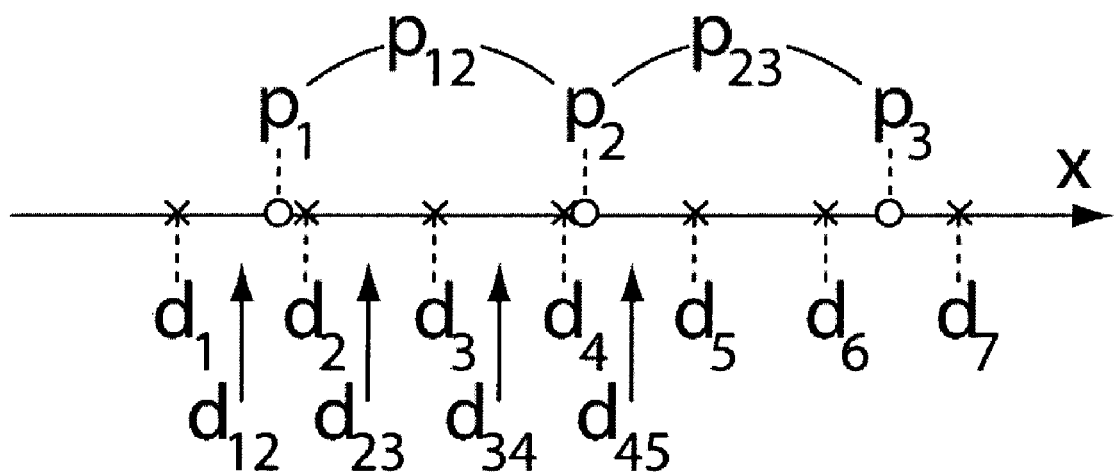
FIG. 8 depicts a distance-driven projector-backprojector providing a closer view of the interlaced pattern of pixel interfaces pi and detector interfaces di.

FIG. 8 shows a more detailed view of the interlaced pattern of detector interfaces $d_i$, pixel interfaces $p_i$, detector values $d_{ij}$, and pixel values $p_{ij}$. In this example the contribution of the row under consideration to the ray sums $d_{ij}$ can be written as $$d_{23} = p_{12}$$
$$d_{34} = p_{12}$$
$$d_{45} = \frac{(p_2 - d_4) \cdot p_{12} + (d_5 - p_2) \cdot p_{23}}{d_5 - d_4}.$$

Eqn (5)

while for the backprojection we have $$p_{12} = \frac{((d_2 - p_1) \cdot d_{12} + (d_3 - d_2) \cdot d_{23} + (d_4 - d_3) \cdot d_{34} + (p_2 - d_4) \cdot d_{34})}{p_2 - p_1}$$
$$p_{23} = \frac{(d_5 - p_2) \cdot d_{45} + (d_6 - d_5) \cdot d_{56} + (p_3 - d_6) \cdot d_{67}}{p_3 - p_2}.$$

Eqn (6)

Figure 9:
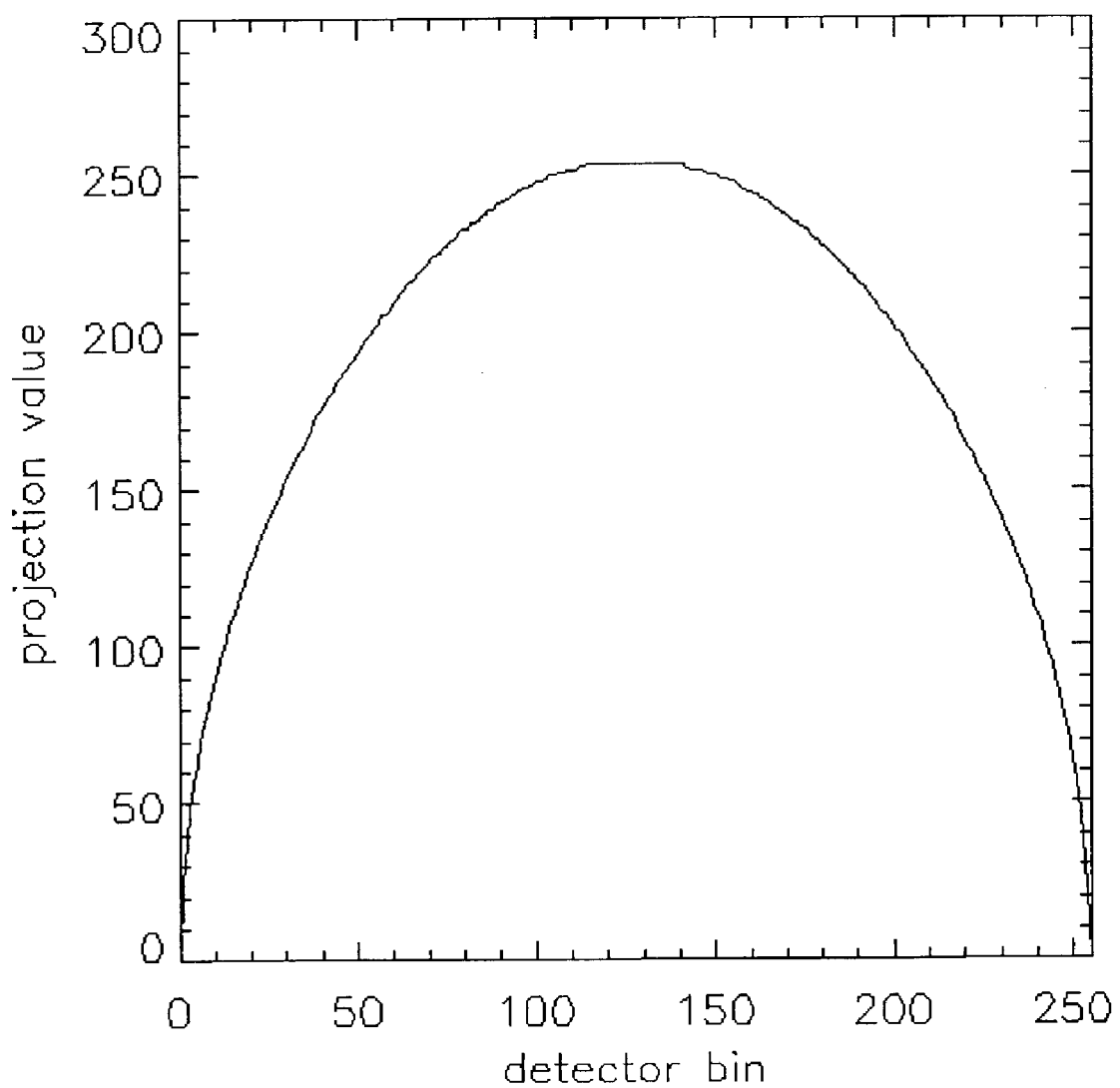
FIG. 9 graphically depicts a distance-driven projection of a uniform disk wherein the high-frequency oscillations are entirely eliminated.

FIG. 9 shows the distance-driven projection of a uniform disk, equivalent to the result of the pixel-driven projection in FIG. 4. As will be appreciated, the high-frequency oscillations are, just like with the adapted pixel-driven projector and with the line-driven projector, entirely eliminated using this technique.

Figure 10:
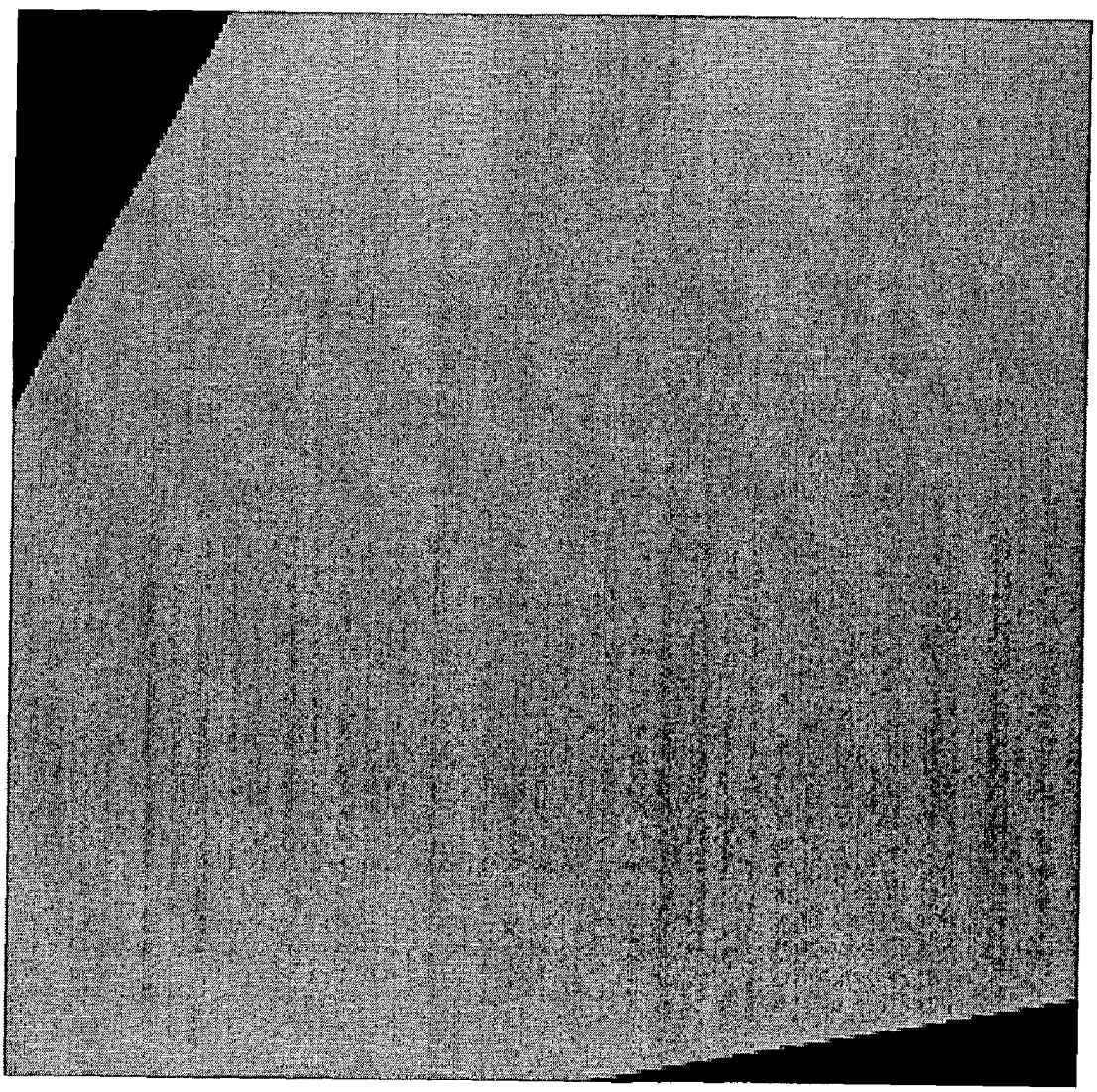
FIG. 10 is a distance-driven backprojection of a uniform view wherein the high-frequency artifacts are entirely eliminated.

FIG. 10 shows the distance-driven equivalent of the result of the ray-driven backprojection in FIG. 3. Again, the high-frequency artifacts are entirely eliminated with this approach, just like with the pixel-driven backprojector and with the adapted line-driven backprojector.

Figure 11:
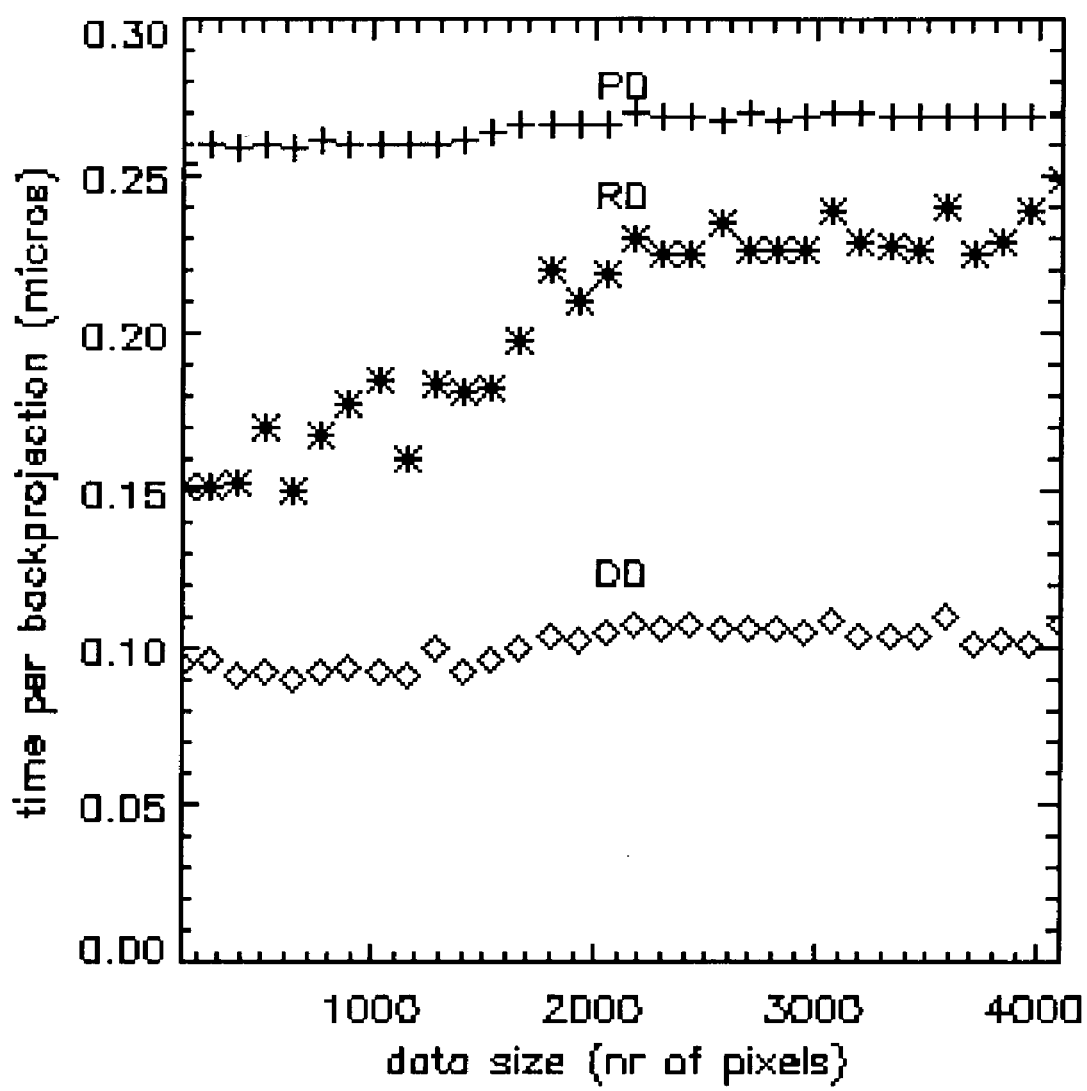
FIG. 11 is a graph showing plots of time per backprojection for a SUN E4500 computer versus data size.

For a comparison of the performance backprojection was focused on inasmuch as computation times for projection and backprojection are very similar. Both the images and the sinograms were chosen to be n×n pixels. FIG. 11 is a graph which shows the time required per backprojection versus data size in using the three different approaches for a SUN E4500 (10 UltraSPARC-II, 400 Mhz, 8 Mb cache, 10 GB RAM). For small data sizes the arithmetic process forms the bottleneck as all the data fits in the cache memory. The pixel-driven approach clearly performs worst here, while the distance-driven approach comes close to the ray-driven approach. The same optimization effort has been applied to all three algorithms. For larger data sets the memory access time becomes more important, as now the entire image no longer fits in the cache memory. It is only the ray-driven approach that really suffers from this, because the memory access is not sequential. This explains the slope of the curve for the ray-driven method. For larger data sets, the pixel-driven and distance-driven approaches have the big advantage that they can be implemented in hardware. The ray-driven one cannot, as hardware hack-projectors cannot generally afford to have access to all of the memory at once.

The above-disclosed distance-driven projection-backprojection method is summarized below. However, in order to better appreciate the nature of this technique the unamended pixel driven and ray-driven techniques will be firstly outlined.

Pixel-Driven Technique:

Address all image pixels (*), and for each image pixel execute the following steps:
    Determine a line connecting the source and the center of the image pixel.
    Find the intersection of this line with the detector array.
    Determine the two detector bins whose centers are nearest to the intersection.
    For the backprojection: calculate the value at this intersection by linear interpolation between the two detector bins, and assign this value to the image pixel
    For the (re-)projection: assign the value of the image pixel to the two detector bins, using the same weights as in the backprojection Ray-Driven Technique:

Address all projection lines (**) (in all views): a projection line is defined by connecting the source and the center of a detector bin.

For each projection line execute the following steps:
    For the (re-)projection: reset the projection sum.
    Address all image rows (*), and for each image row (*) do the following steps:
        Calculate the intersection of the projection line with (the centerline of) the image row (***).
        Determnine the two image pixels in this row (***) whose centers are nearest to the intersection.
        For the (re-)projection:
    calculate the value at this intersection by linear interpolation between the two image pixels, and add this value to the projection sum.
    For the backprojection: add the value of the detector bin to the two image pixels, using the same weights as in the (re-)projection.
    For the (re-)projection: assign the projection sum to the detector bin.

Distance-driven technique:

Address all views, and for each view, execute the following steps:
    For each detector bin:
        Determine the edges of the detector bin:
        Determine a line by connecting the detector bin edge and the x-ray source
        Calculate the intersection of this line with the x-axis (***)
        This intersection defines the projected detector bin edge
    Address all image rows, and for each image row execute the following steps:
        Address all image pixels in this rows, and for each image pixel execute the following steps:
        Determine the left and right (***) edges of the image pixel:
        Determine a line by connecting the pixel edge and the x-ray source.
        Calculate the intersection of this line with the x-axis (***).
        This intersection defines the projected pixel edge.
        Make a sorted list of projected detector bin edges and projected pixel edges Start at the first edge that is most left on the x-axis (***), and determine the current pixel and the current detector bin.
Until the most right edge is reached, execute the following steps:
Determine which is the next edge (****).
Update the current pixel or the current detector bin.
Calculate the weight factor as the position of the current edge minus the position of the previous edge.
For the (re-)projection: multiply the value of the current image pixel by the weight factor and add it to the current detector bin.
For the backprojection: multiply the value of the current detector bin by the weight factor and add it to the current image pixel Key:
(*) denotes/pertains to "pixel-driven"
(**) denotes/pertains to "ray-driven"
(***) If the orientation of the projection lines is more horizontal than vertical, then the following conversions are necessary:
'row' <--> 'column'
'x-axis' <--> 'y-axis'
'left' <--> 'bottom'
'right' <--> 'top'
(****) denotes/pertains to "distance-driven" feature It should be noted that this summary of the disclosed techniques is illustrative and not to be taken as specifically limiting the scope of the invention and that while the preceding disclosure has focused only on a limited number of projecting and backprojecting methods the application of these techniques is not limited to CT applications. It should also be noted that adapting the conventional ray-driven and pixel-driven linear interpolation eliminates high-frequency artifacts, under given restrictive assumptions. The distance-driven method however, entirely eliminates artifacts without any restrictive assumptions, in each view, all the data contributes uniformly to the resulting projection or backprojection, and it has favorable computational properties.

Additionally, although methods for a 2D flat-detector fan-beam CT geometry have been discussed, it will be understood that the methods and conclusions are not limited thereto and that one of skill in this art or one closely related thereto, will appreciate that the concepts are adaptable to other 2D- and 3D (or more)-geometries, including, merely by way of example, PET-and SPECT-geometries.

Figure 12:
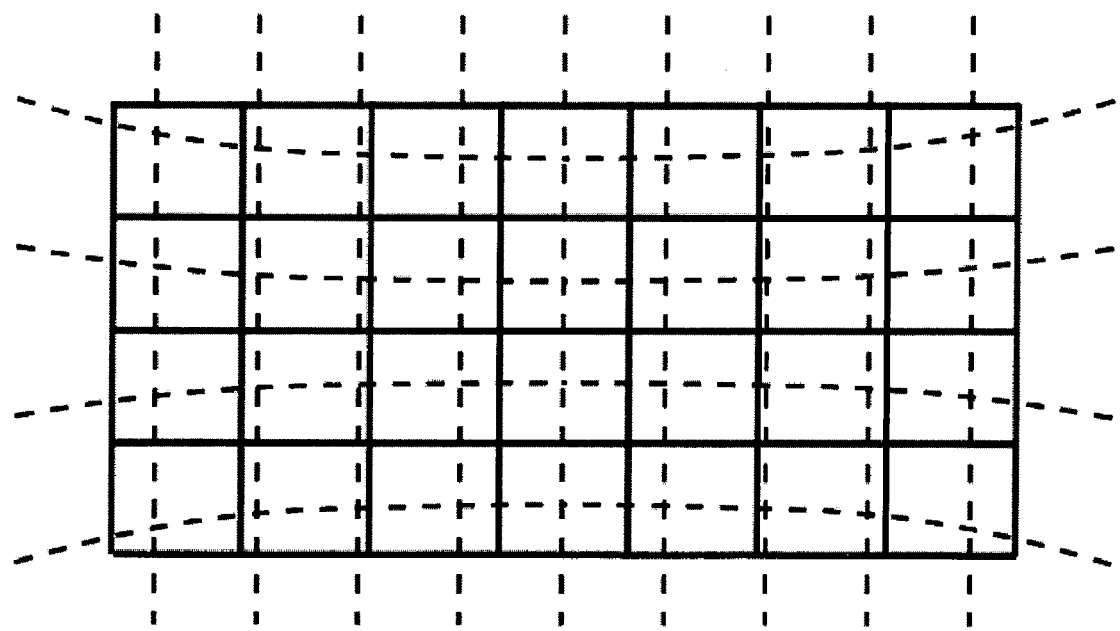
FIG. 12 depicts a distance-driven reprojector-backprojector wherein both the detector bin interfaces and the voxel interfaces are mapped onto the x-z plane.
Figure 14:
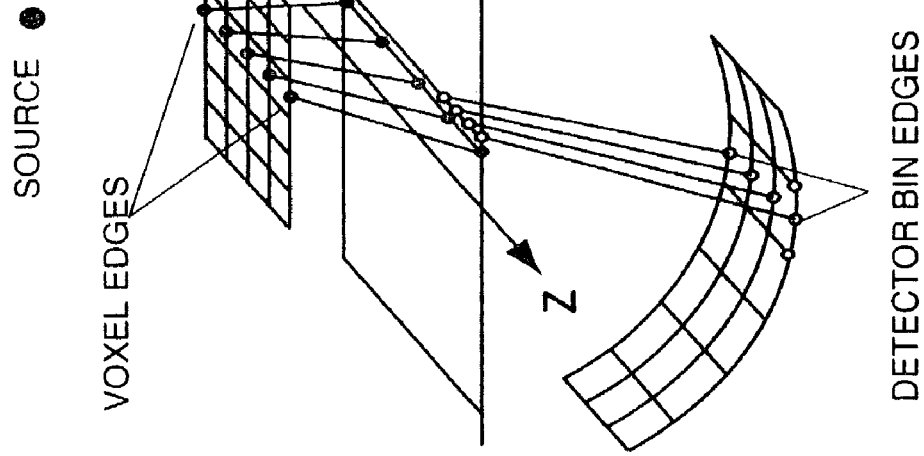
FIG. 14 depicts a distance-driven reprojector-backprojector wherein both the detector bin interfaces and the voxel interfaces are mapped onto an axis parallel to the z-axis.
Figure 13:
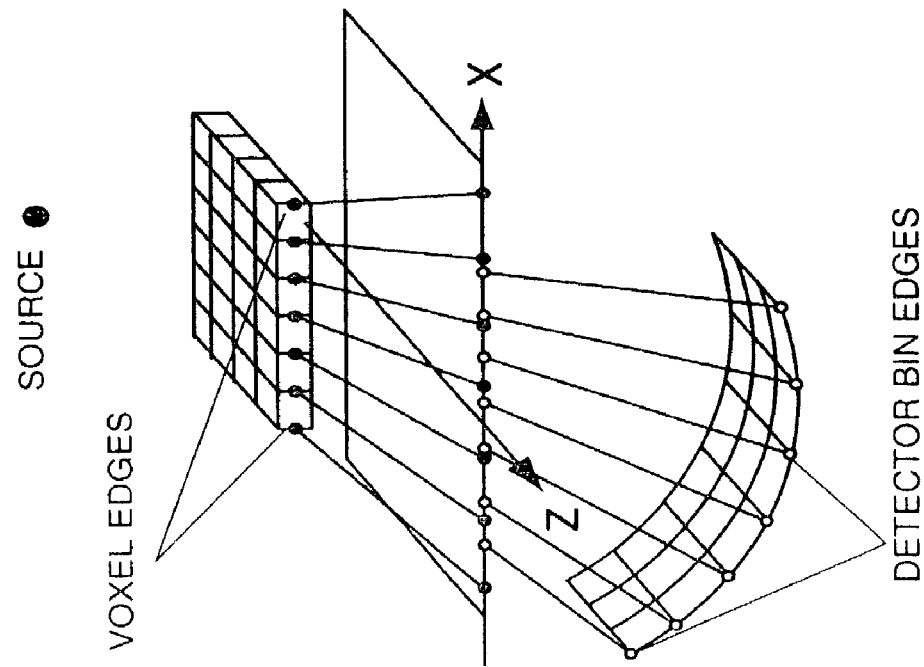
FIG. 13 depicts a distance-driven reprojector-backprojector wherein both the detector bin interfaces and the voxel interfaces are mapped onto the x axis.

Extension to Three Dimensions (3D):

One embodiment of extending the distance-driven method to 3D is to apply the 2D version combined with interpolation in the z-direction. However, the z-interpolation needs to be either pixel-driven or ray-driven which, typically, results in artifacts in projection or backprojection, respectively. In another embodiment of the application to 3D, the distance-driven principle described hereinabove is applied in the z-direction as well. As shown in FIG. 12, the image boundaries of each voxel are shown against the detector boundaries. In this embodiment, all image planes parallel to the xz-plane are mapped onto the detector (or vice versa) along the projection direction. As further shown in FIGS. 13 and 14, this technique maps all detector and image boundaries of each voxel (both x-boundaries and z-boundaries) onto the xz-plane. To obtain an efficient implementation, all z-calculations are performed in the inner loop that allows all x-calculations to be reused. To minimize memory access time, the image is stored with the plane number as the least significant index, and the sinogram is stored with the detector row as the least significant index. As shown in FIG. 14, the mapping of the image boundaries and the detector boundaries onto the xz-plane are not necessarily coincident on the identical portions of the x-z plane, but both are mapped on an axis parallel to the z-axis, and it is only the resulting z-values that are needed for subsequent calculations.

It should be appreciated that the technique has been described herein as mapping the boundaries on the x-z plane. However, it should be appreciated that the selection of the x-z plane is arbitrary, the technique can be extended to mapping onto other planes such as the y-z plane. It should also be appreciated that the detector boundaries can lie on a non-linear plane due to the geometry of the detector.

In one embodiment, the focal point of the detector can be viewed as being infinitely far away from the image grid and the detector. This situation is termed as a parallel-beam geometry where all projection lines are essentially parallel. It should be appreciated that the method described herein is applicable in the parallel-beam geometry.

In the embodiments described hereinabove, the order in which the image is accessed has been described as if the image were a stack of planes parallel to the xz-plane and those planes were accessed sequentially. It should be appreciated that this particular description has been made for ease of illustration, and the image can be accessed in ways other than those described herein, for example the image can be accessed as a sequence of yz-planes. As such, the methods described herein should be interpreted as extending to and encompassing any manner of accessing the image.

It should further be appreciated that instead of mapping the voxel edges and detector bin edges as described herein, the method can map other entities, such as voxel centers and detector bin centers. By this mapping these other entities, the method described herein will keep the same performance advantages but may loose some preferable artifact characteristics.

Figure 15:
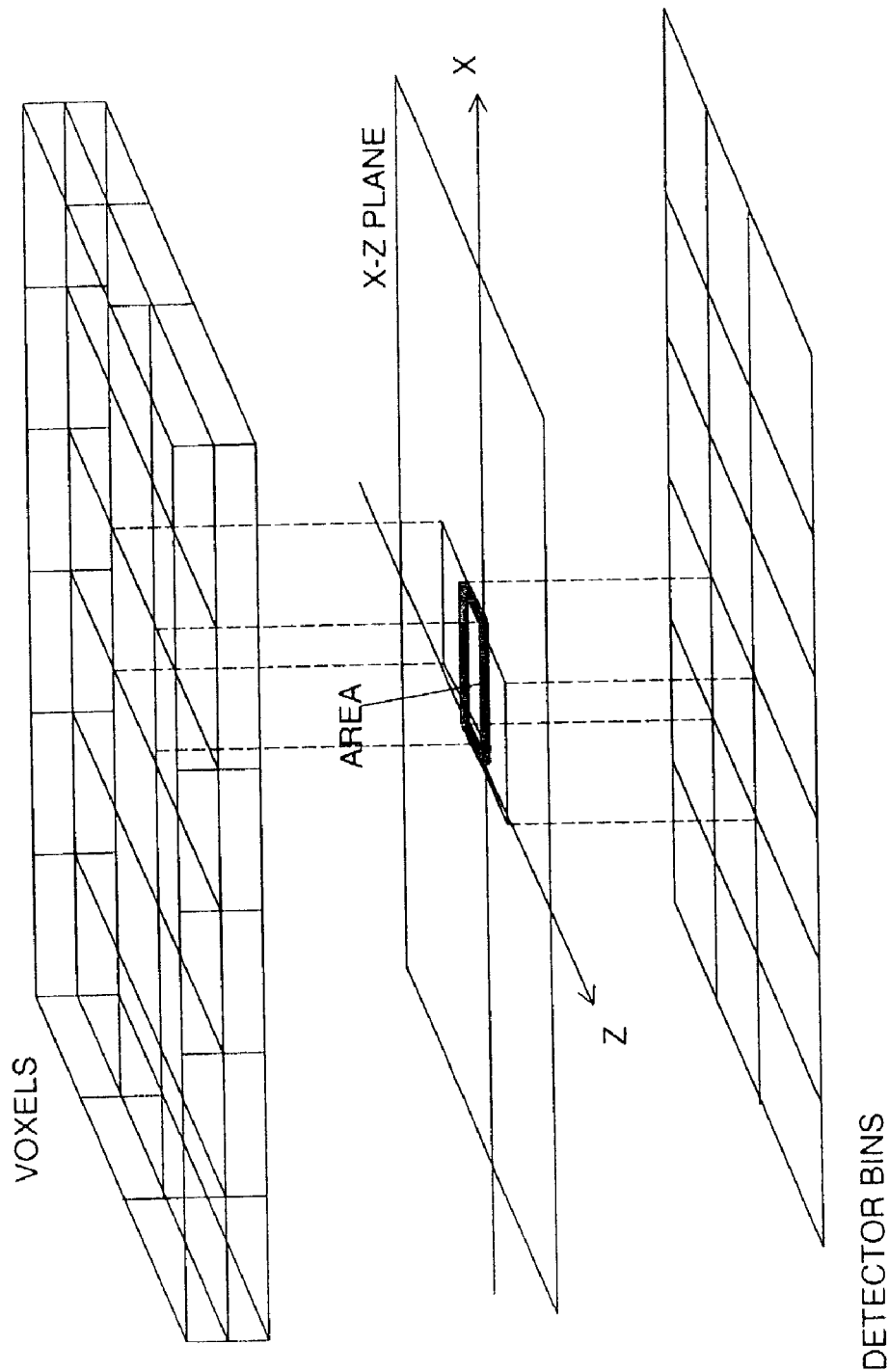
FIG. 15 depicts a distance-driven reprojector-backprojector wherein both the detector bin interfaces and the voxel interfaces are mapped onto the x-z plane, and wherein the area using the mapped projection is used as weight factors in the projection and backprojection.

3D Distance-driven technique, as shown in FIG. 15:
Address all views, and for each view, execute the following steps:
For each detector bin:
Determine the edges of the detector bin:
For each detector bin edge, determine a plane by connecting the detector bin edge and the x-ray source
Calculate the intersection of this plane with the x-z plane
This intersection defines the projected detector bin edge
Address the entire image as a sequence of planes parallel to the xz-plane and for each image plane execute the following steps:
Address all image voxels in the plane, and for each image voxel execute the following steps:
Determine the edges of the image voxel in the x-direction.
Determine the edges of the image voxel in the z-direction.
For each voxel edge, determine a plane by connecting the voxel edge and the x-ray source.
Calculate the intersection of this plane with the x-z plane.
This intersection defines the projected voxel edge.
Make a sorted list of projected detector bin edges and projected voxel edges
Start at the first edge, and determine the current voxel and the current detector bin.
Until the last edge is reached, execute the following steps:

Determine which is the next edge.

Calculate the weight factor as the area bounded by the projected voxel edges and the projected detector bin edges.

For the (re-)projection: multiply the value of the current image voxel by the weight factor and add it to the current detector bin.

For the backprojection: multiply the value of the current detector bin by the weight factor and add it to the current image voxel.

Update the current voxel or the current detector bin.

The foregoing discussion of the invention has been presented for purposes of illustration and description. Further, the description is not intended to limit the invention to the form disclosed herein. Consequently, variations and modifications commensurate with the above teachings and with the skill and knowledge of the relevant art are within the scope of the present invention. The embodiment described herein above is further intended to explain the best mode presently known of practicing the invention and to enable others skilled in the art to utilize the invention as such, or in other embodiments, and with the various modifications required by their particular application or uses of the invention. It is intended that the appended claims be construed to include alternative embodiments to the extent permitted by the prior art.

What is claimed is:

1. A method of image processing comprising:

projecting edges of each voxel of a voxel grid, which are intersected by a plurality of rays projected from a source to a detector, in a predetermined sequence of voxels in the voxel grid, onto a predetermined plane;

projecting the edges of each bin of a detector onto the predetermined plane; and determining the contribution of each voxel to a bin of the detector array or vice versa in accordance with the projections of the voxel edges and the detector bin edges on the predetermined plane.

2. A method of image processing as set forth in claim 1, wherein the step of projecting the edges of the voxel onto the predetermined plane comprises projecting a selected line on a side of the voxel onto the predetermined plane.

3. A method of image processing as set forth in claim 1, wherein the predetermined plane is an arbitrarily selected plane.

4. A method of image processing as set forth in claim 1, wherein the predetermined plane is parallel to an x-z plane.

5. A method of image processing comprising:

establishing a voxel grid containing image voxels, which are arranged in image rows, columns and planes;

continuously mapping transitions between image voxels and transitions between detector-bins of a detector which has detected radiation from a source comprising:

projecting detector bin transitions onto a predetermined plane;

projecting the voxel transitions onto the predetermined plane; and weighting at least one of the detector bins and voxels with an area on the predetermined plane, based on an area limited by adjacent projections.

6. A computer readable medium encoded with a program executable by a computer for processing an image, said program being configured to instruct the computer to:

project edges of each voxel of a voxel grid, which is intersected by a plurality of rays projected from a source to a detector, in a predetermined sequence of voxels in the voxel grid, onto a predetermined plane;

project the edges of each bin of a detector onto the predetermined plane; and determine the contribution of each voxel to a bin of the detector array or vice versa in accordance with the projections of the voxel edges and the detector bin edges on the predetermined plane.

7. A computer readable medium as set forth in claim 6, wherein the step of projecting the edges of the voxel onto the predetermined plane comprises projecting a selected line on a side of the voxel onto the predetermined plane.

8. A computer readable medium as set forth in claim 6, wherein the predetermined plane is an arbitrarily selected plane.

9. A computer readable medium as set forth in claim 6, wherein the predetermined plane is parallel to an x-z plane.

10. A computer readable medium encoded with a program executable by a computer for processing an image, said program being configured to instruct the computer to:

establish a voxel grid containing image voxels, which are arranged in image rows, columns and planes;

continuously map transitions between image voxels and transitions between detector-bins of a detector which has detected radiation from a source comprising:

project detector bin transitions onto a predetermined plane;

project the voxel transitions onto the predetermined plane; and weight at least one of the detector bins and voxels with an area on the predetermined plane, based on an area limited by adjacent projections.

* * * * *